(12) United States Patent
Stenfelt et al.

(10) Patent No.: US 8,774,198 B2
(45) Date of Patent: Jul. 8, 2014

(54) MULTIPLE ACCESS SYSTEM

(75) Inventors: John Stenfelt, Gothenburg (SE); Lars Gunnar Lovsen, Gothenburg (SE); Stefan Rommer, Vastra Frolunda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 61 days.

(21) Appl. No.: 13/148,357

(22) PCT Filed: Feb. 9, 2009

(86) PCT No.: PCT/EP2009/051444
§ 371 (c)(1),
(2), (4) Date: Aug. 8, 2011

(87) PCT Pub. No.: WO2010/088967
PCT Pub. Date: Aug. 12, 2010

(65) Prior Publication Data
US 2011/0310906 A1 Dec. 22, 2011

(51) Int. Cl.
*H04L 12/56* (2006.01)
(52) U.S. Cl.
USPC ........................................................ 370/401
(58) Field of Classification Search
USPC .................................................. 370/389, 401
See application file for complete search history.

(56) References Cited

U.S. PATENT DOCUMENTS

2009/0316698 A1* 12/2009 Menten .......................... 370/392

OTHER PUBLICATIONS

3GPP TS 29.212 V7.7.0: "3rd Generation Partnership Project; Technical Specification Group Core Network and Terminals; Policy and Charging Control over Gx reference point (Release 7)", Dec. 2008.*
"Universal Mobile Telecommunications System (UMTS); LTE; Policy and charging control over Gx reference point (3GPP TS 29.212 version 7.7.0 Release 7); ETSI TS 129 212" ETSI Standard, European Telecommunications Standards Institute (ETSI), Sophia Antipolis Cedex, France, vol. 3-CT3, No. V7.7.0, Feb. 1, 2009, XP014043339.
3GPP: "3GPP TS 23.402 V8.3.0, (Sep. 2008) Technical Specification 3rd Generation Partnership Project; Technical Specification Group Services and System Aspects; Architecture enhancements for non-3GPP accesses (Release 8)" 3GPP TS 23.402 V8.3.0, Sep. 1, 2008, pp. 13-44, XP007908990.
3GPP TS 23.203 V8.4.0 (Dec. 2008), "3rd Generation Partnership Project; Technical Specification Group Services and System Aspects; Policy and charging control architecture (Release 8)", pp. 19, 21-54, 56, 57, XP014043013.

* cited by examiner

*Primary Examiner* — Dang Ton
*Assistant Examiner* — Kevin Lee
(74) *Attorney, Agent, or Firm* — Rothwell, Figg, Ernst & Manbeck, P.C.

(57) ABSTRACT

A Packet Data Network Gateway, a PDN-GW (105), arranged to receive and forward packet data of at least a first and a second service flow in both an uplink and a downlink direction, with a first access network (125) of a first kind being used for the first service flow and a second access network (130) of a second kind being used for the second service flow. The PDN-GW (105) is arranged to transmit to a PCRF (110), a Policy and Charging Rules Function, information regarding which kinds of access networks that the PDN-GW (105) can handle, and to receive, in reply from the PCRF, rules for which of said access networks (125, 130) that should be used for said service flows. The PDN-GW (105) is also arranged to use said rules to bind a service flow to an access network (125, 130) in the downlink direction and to perform access network binding verification in the uplink direction.

7 Claims, 3 Drawing Sheets

MULTIPLE ACCESS SYSTEM

CROSS-REFERENCE TO RELATED APPLICATION

This application is a 35 U.S.C. §371 National Phase Entry Application from PCT/EP2009/051444, filed Feb. 9, 2009, and designating the United States, the disclosure of which is incorporated herein in its entirety by reference.

TECHNICAL FIELD

The present invention discloses a multiple access system in a communications network.

BACKGROUND

Within 3GPP, work has recently started on a new Work Item called Multi Access PDN connectivity and IP flow mobility, MAPIM. The intention is to introduce support for simultaneous access from a terminal to multiple heterogeneous access networks (technologies) such as UMTS/GPRS, LTE, WLAN, WiMax, DOCSYS and fixed broadband access. In a possible scenario, a terminal would use both e.g. WCDMA access and WLAN access to access the same destination Packet Data Network, PDN, using one and the same IP-session. The system would then support operator defined policies for service-based routing of the UE IP-flows via different access systems.

SUMMARY

It is an object of the present invention to enable a system of the kind described above to associate different service flows with different access networks.

This object is achieved by the present invention in that it discloses a Packet Data Network Gateway, a PDN-GW, which is arranged to receive and forward packet data of at least a first and a second service flow in both an uplink and a downlink direction, with a first access network of a first kind being used for the first service flow and a second access network of a second kind being used for the second service flow.

The PDN-GW of the invention is arranged to transmit to a PCRF, a Policy and Charging Rules Function, information regarding which kinds of access networks that the PDN-GW can handle, and to receive, in reply from the PCRF, rules for which of said access networks that should be used for said service flows.

The PDN-GW of the invention is also arranged to use said rules to bind a service flow to an access network in the downlink direction and to perform access network binding verification in the uplink direction.

In one embodiment of the PDN-GW, the transmission to and reception from the PCRF, as well as the use of said rules is carried out in a Policy and Charging Enforcement Function, a PCEF, in the PDN-GW.

In one embodiment, the PDN-GW is arranged to receive and use said rules as packet filters.

In one embodiment of the PDN-GW, said filters utilize protocol header info in the packets.

In one embodiment of the PDN-GW, said filters utilize application information in the packets.

In one embodiment of the PDN-GW, the access networks include two or more of the following: UMTS/GPRS, LTE, WLAN, WiMax, DOCSYS and fixed broadband access.

BRIEF DESCRIPTION OF THE DRAWINGS

The invention will be described in more detail in the following, with reference to the appended drawings, in which.

DETAILED DESCRIPTION

Figure 1:
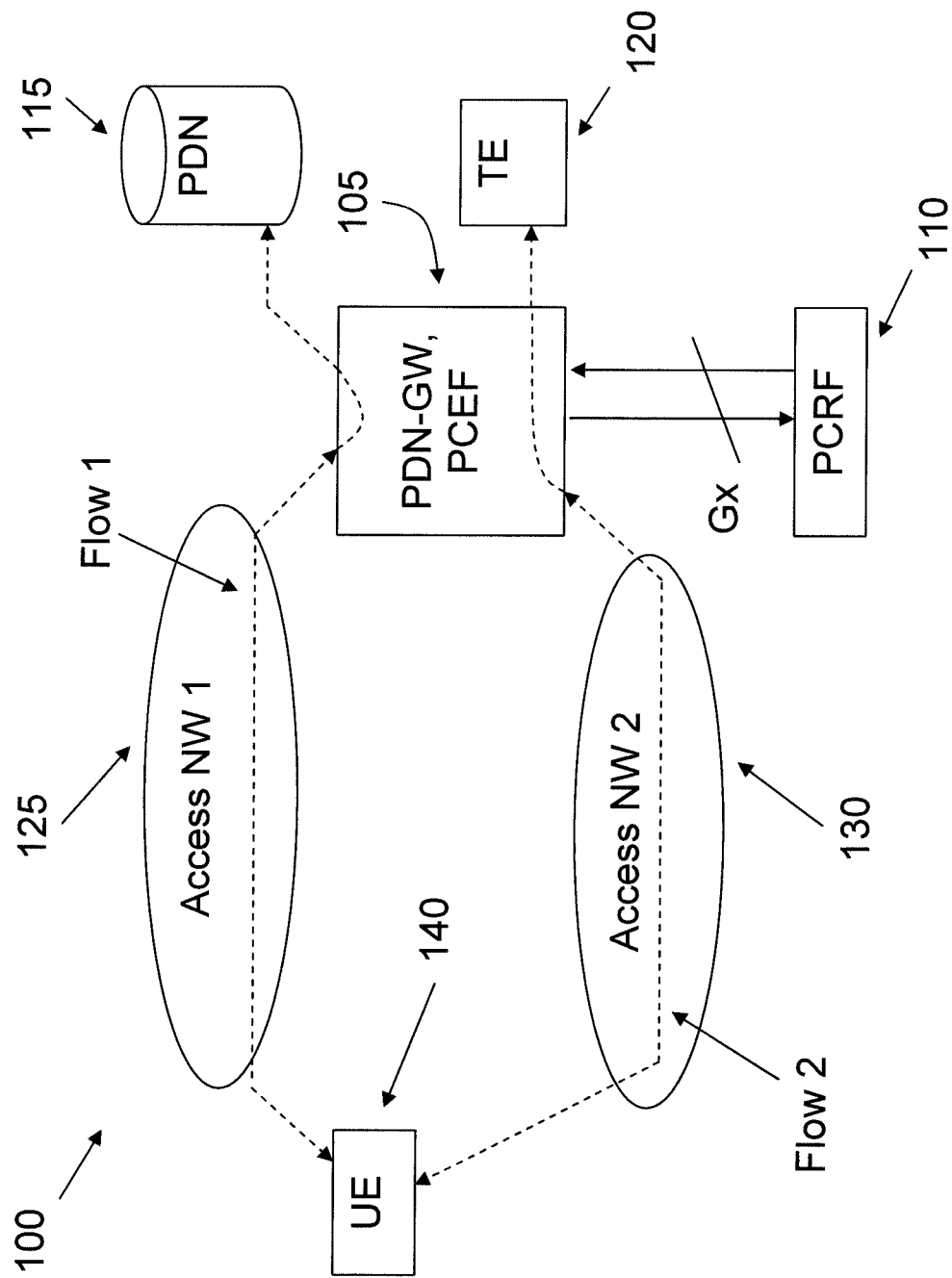
FIG. 1 shows an overview of a system in which the invention is applied.

FIG. 1 shows an overview of a system 100 for which the invention is intended. As shown, the system 100 can accommodate one or more User Equipment, UE, one of which is shown as 140 in FIG. 1.

The UE 140 can use a number of service flows simultaneously, and can also operate on two or more access networks simultaneously, so that if, as shown in FIG. 1, there are two simultaneous service flows, Flow 1, Flow 2, and two Access Networks, 125, 130, each service flow can be assigned to "its own" Access Network.

The system 100 is a packet data system, and comprises a so called PDN-GW, Packet Data Network Gateway, which interfaces towards, for example, a Packet Data Network PDN 115 and Terminal Equipment TE 120.

Figure 2:
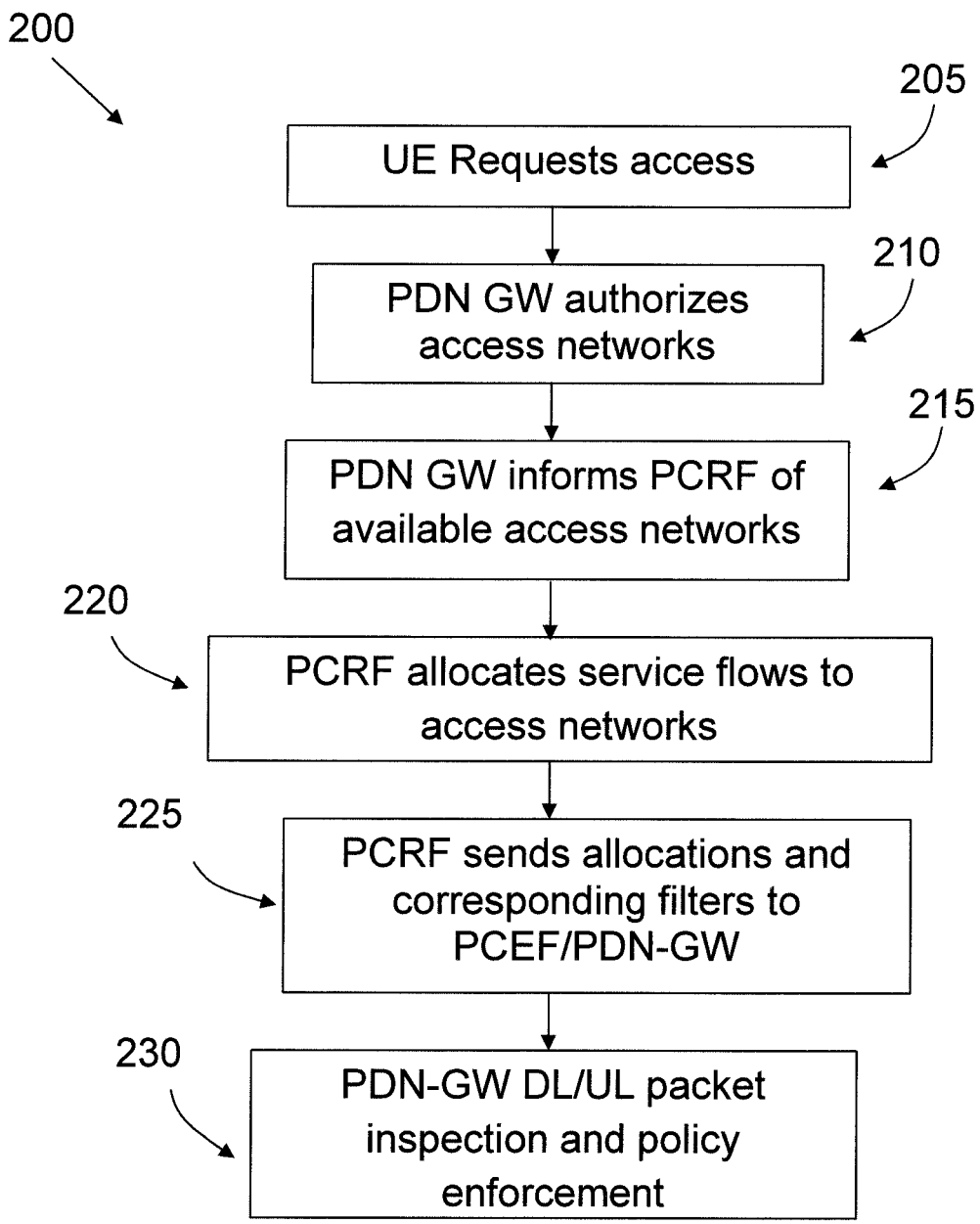
FIGS. 2 and 3 show flow charts of a method of the invention.

The PDN GW 105 has a so called Gx interface towards a Policy and Charging Rules Function, a PCRF 110. A principle behind the present invention is to let the PCRF 110 inform the PDN-GW 105 of which service flows that should be associated with which Access Networks, both in the uplink, UL, and downlink, DL, directions. A schematic flow chart 200 of how this is done on the control plane is shown in FIG. 2:

In step 205, the UE requests access to one or more access networks, such as, for example, WLAN and UMTS/GPRS. In step 210, the PDN-GW authorizes those access networks to the UE. In step 215, the PDN-GW informs the PCRF 110 of the available access networks for the UE 140.

In step 220, the PCRF allocates service flows to/from the UE 140 to the available access networks for the UE 140. In step 225 the PCRF 225 sends the allocations and corresponding filters to the PDN-GW 105, suitably to the so called Policy and Charing Enforcement Function, the PCEF in the PDN-GW.

As shown in step 230, the PDN-GW 105 can then inspect packets in both the UL and the DLK and enforce the access network policies sent by the PCRF.

Figure 3:
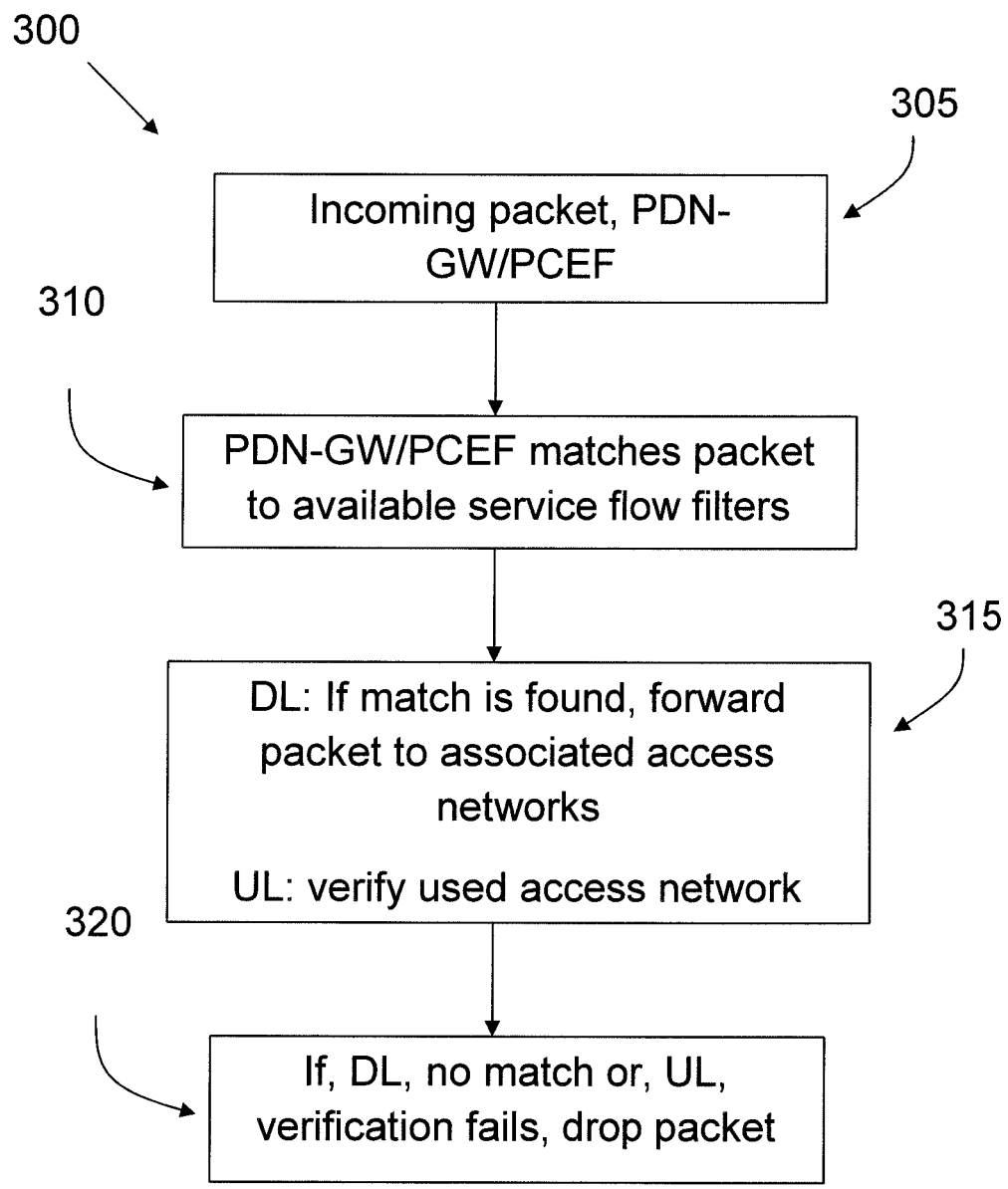

Before more is said about the filters used in the PDN-GW, the invention will now be described on the user plane with reference to FIG. 3 which shows a method 300 for this:

Step 305 shows an incoming data packet, UL or DL, to the PD-GW, or the PCEF in the PDN-GW. As shown in step 310, the PDN-GW or its PCEF matches the packet to the service flow filters.

In the DL, if a match is found, the PDN-GW forwards the packet to the associated access network, and in the UL, the PDN-GW attempts to verify that the packet was sent on the correct access network.

If, in the DL, no match is found, the PDN-GW drops the packet, which is also done in the UL if the verification fails.

Turning now to the filters (or "rules", as an alternative name) which the PDN-GW receives from the PCRF and uses to bind/verify packets to the correct networks, the following can be said about the filters:

Operations on dynamic PCC-rules over the Gx-interface include installation, modifications and removal of rules on a per IP-session basis. This invention would affect the installation, modification and possibly also the removal procedures.

For those procedures, the Charging-Rule-Definition AVP would be provided within the Charging-Rule-Install AVP or in a Charging-Rule-Remove APV in either a Credit Control Answer (CCA) message, as a reply to a Credit Control Request (CCR), or in a Re-Authorization Request (RAR) message sent by the PCRF to the PCEF.

The Charging-Rule-Definition AVP contains all the necessary information for the PCEF to identify whether or not an incoming packet belongs to the Service Data Flow of a dynamic PCC Rule or not.

This invention proposes to either complement the Charging-Rule-Definition AVP with the access specific information or to include this information in the Charging-Rule-Install AVP and in the Charging-Rule-Remove AVP. Both these cases should be covered for completeness. An example realization of the first case would be:

```
Charging-Rule-Definition ::= < AVP Header: 1003 >
    { Charging-Rule-Name }
    [ Service-Identifier ]
    [ Rating-Group ]
    *[ Flow-Description ]
    ... (other AVPs are left out) ...
    "Access-Network-Information"
    *[ AVP ]
```

An example realization of the second case would be:

```
Charging-Rule-Install ::= < AVP Header: 1001 >
    *[ Charging-Rule-Definition ]
    *[ Charging-Rule-Name ]
    *[ Charging-Rule-Base-Name ]
    [ Bearer-Identifier ]
    "Access-Network-Information"
    *[ AVP ]
Charging-Rule-Remove ::= < AVP Header: 1002 >
    *[ Charging-Rule-Name ]
    *[ Charging-Rule-Base-Name ]
    "Access-Network-Information"
    *[ AVP ]
```

The Access-Network-Information (this is just a generic name and not a parameter) could be e.g. the IP-CAN-Type AVP defined in TS 29.212. This AVP is currently used in Rel8 Gx on message level to indicate the type of Connectivity Access Network in which the user is connected. In the example above the same AVP would be used to indicate which specific IP-CAN the PCC rule or PCC rule operation applies to.

The Access-Network-Information could also be an identifier to a specific access network e.g. PLMN-id. This would be useful in case access to multiple homogenous networks is allowed e.g. access to multiple WLANs at the same time.

Note also that Access-Network-Information is not necessarily restricted to a single network but may define a list of valid access networks or types of access networks (possible with a preference assigned). For this case the PCRF would not be required to provide updated policy decisions to the PCEF in case the UE/NW would decide to re-direct the IP-flow to one of the allowed accesses.

The Access-Network-Information would be used by the PCEF at classification of incoming packets. Downlink packets classified to a service data flow associated with a certain PCC rule will be forwarded to the selected access network in accordance to the access specific information of the PCC rule. Classified packets in the uplink from the different accesses will be verified against this information (out of profile packets may be dropped).

The invention is not limited to the examples of embodiments described above and shown in the drawings, but may be freely varied within the scope of the appended claims.

What is claimed is:

1. A Packet Data Network Gateway (PDN-GW), the PDN-GW being configured to:
   receive from a user equipment (UE) information identifying a set of two or more access networks that are available for the UE to use concurrently, the set of two or more access networks including a first access network of a first type and a second access network of a second type that is different than the first type,
   transmit to a Policy and Charging Rules Function (PCRF) information identifying the set of two or more access network types that are available for the UE to use concurrently,
   receive, in reply from the PCRF, filter information indicating that the PCRF has a) allocated a first service flow to or from said UE with the first access network and b) allocated a second service flow to or from the UE with the second access network,
   use said filter information received from the PCRF to a) bind the first service flow to the first access network and b) bind the second service flow to the second access network,
   receive a downlink packet addressed to the UE, wherein the downlink packet is associated with a service flow and the filter information received from the PCRF includes a rule associated with the service flow with which the packet is associated, which rule binds the service flow with which the packet is associated to one of the two or more access networks; and
   in response to receiving the downlink packet:
   a) determine, based on information included in the packet, the service flow with which the packet is associated;
   b) obtain, from the filter information received from the PCRF, the rule associated with the determined service flow with which the packet is associated;
   c) determine, based on the obtained rule, the access network with which the determined service flow is bound; and
   d) transmit, via the determined access network, the received packet towards the UE.

2. The PDN-GW of claim 1, wherein the PDN-GW includes a Policy and Charging Enforcement Function (PCEF) that is arranged to transmit to the PCRF the information identifying the set of two or more access networks that are available for the UE and is further arranged to use the filter information received from the PCRF.

3. The PDN-GW of claim 1, being arranged to receive and use said filter information as packet filters.

4. The PDN-GW of claim 3, in which said packet filters utilize protocol header information in the packets.

5. The PDN-GW of claim 3, in which said packet filters utilize application information in the packets.

6. The PDN-GW of claim 1, in which the set of two or more access networks include two or more of the following: UMTS/GPRS, LTE, WLAN, WiMax, DOCSYS, fixed broadband access.

7. A method performed by a gateway apparatus, the method comprising:
   the gateway apparatus receiving from a user equipment (UE) information identifying a set of two or more access networks that are available for the UE to use concurrently, the set of two or more access networks including a first access network of a first type and a second access network of a second type that is different than the first type;

the gateway apparatus transmitting to a Policy and Charging Rules Function (PCRF) information identifying the set of two or more access network types that the UE can use concurrently, wherein the PCRF is configured to transmit to the gateway apparatus filter information;

the gateway apparatus receiving the filter information;

the gateway apparatus receiving a downlink packet addressed to the UE, wherein the downlink packet is associated with a particular service and the filter information received from the PCRF includes a rule associated with the particular service flow with which the packet is associated, which rule binds the particular service flow with which the packet is associated to an access network type; and in response to receiving the downlink packet:

a) determine, based on information included in the packet, the particular service flow with which the packet is associated;

b) obtain, from the filter information received from the PCRF, the rule associated with the determined service flow with which the packet is associated;

c) determine, based on the obtained rule, the access network with which the determined service flow is bound; and d) transmit, via the determined access network, the received packet towards the UE.

* * * * *

UNITED STATES PATENT AND TRADEMARK OFFICE
CERTIFICATE OF CORRECTION

PATENT NO. : 8,774,198 B2
APPLICATION NO. : 13/148357
DATED : July 8, 2014
INVENTOR(S) : Stenfelt et al.

Page 1 of 1

It is certified that error appears in the above-identified patent and that said Letters Patent is hereby corrected as shown below:

On the Title Page, Item (75), under "Inventors", in Column 1, Line 2, delete "Lovsen," and insert -- Lövsén, --, therefor.

On the Title Page, Item (75), under "Inventors", in Column 1, Line 3, delete "Vastra Frolunda," and insert -- Västra Frölunda, --, therefor.

In the Specification

In Column 2, Line 42, delete "Charing" and insert -- Charging --, therefor.

In Column 2, Line 51, delete "PD-GW," and insert -- PDN-GW, --, therefor.

In Column 3, Line 3, delete "APV" and insert -- AVP --, therefor.

Signed and Sealed this
Thirty-first Day of March, 2015

Michelle K. Lee
*Director of the United States Patent and Trademark Office*